United States Patent
Verma

(10) Patent No.: US 12,159,443 B2
(45) Date of Patent: Dec. 3, 2024

(54) PREVIEWING AND GENERATING STROKE OUTLINES IN ASSOCIATION WITH IMAGES

(71) Applicant: Adobe Inc., San Jose, CA (US)

(72) Inventor: Abhishek Verma, Noida (IN)

(73) Assignee: Adobe Inc., San Jose, CA (US)

( * ) Notice: Subject to any disclaimer, the term of this patent is extended or adjusted under 35 U.S.C. 154(b) by 106 days.

(21) Appl. No.: 17/743,644

(22) Filed: May 13, 2022

(65) Prior Publication Data

US 2023/0368490 A1 Nov. 16, 2023

(51) Int. Cl.
| | |
|---|---|
| *G06V 10/44* | (2022.01) |
| *G06T 5/20* | (2006.01) |
| *G06T 7/13* | (2017.01) |
| *G06T 11/20* | (2006.01) |
| *G06V 10/20* | (2022.01) |
| *G06V 10/36* | (2022.01) |

(52) U.S. Cl.
CPC .............. *G06V 10/443* (2022.01); *G06T 5/20* (2013.01); *G06T 7/13* (2017.01); *G06T 11/203* (2013.01); *G06V 10/255* (2022.01); *G06V 10/36* (2022.01); *G06T 2207/20028* (2013.01); *G06T 2207/20032* (2013.01)

(58) Field of Classification Search
CPC ... G06T 7/12; G06T 7/13; G06T 2207/10016; G06T 2207/20081; G06T 2207/20084; G06T 7/00; G06T 11/203; G06V 20/40; G06V 10/40; G06V 40/67; G06V 10/235
See application file for complete search history.

(56) References Cited

U.S. PATENT DOCUMENTS

| | | | |
|---|---|---|---|
| 8,487,963 B1 * | 7/2013 | Harris | G06T 11/00 345/643 |
| 10,922,860 B2 * | 2/2021 | Price | G06V 10/82 |
| 2013/0222385 A1 * | 8/2013 | Dorsey | G06T 15/005 345/427 |
| 2017/0032690 A1 * | 2/2017 | Winnemoeller | G06T 7/13 |

(Continued)

OTHER PUBLICATIONS

McGuire et al., Hardware-determined feature edges, NPAR '04: Proceedings of the 3rd international symposium on Non-photorealistic animation and rendering, Jun. 2004, pp. 35-47, //doi.org/10.1145/987657.987663.*

(Continued)

*Primary Examiner* — Guillermo M Rivera-Martinez
(74) *Attorney, Agent, or Firm* — Shook, Hardy & Bacon L.L.P.

(57) ABSTRACT

Embodiments described herein include aspects related to previewing and capturing stroke outlines from a real-world image or a video feed. In one embodiment, a stroke outline preview image is generated by performing an edge detection process on an input image. The stroke outline preview image provides a preview indicating an example of a stroke outline image to be provided for the input image if the input image is selected. A detailed stroke outline image for the input image is generated using a detailed stroke outline process, and an alternative stroke outline image is obtained for the input image using an alternative outline process. Thereafter, the alternative stroke outline image is modified by including in the alternative stroke outline image a portion of stroke outlines from the detailed stroke outline image.

20 Claims, 7 Drawing Sheets

(56) References Cited

U.S. PATENT DOCUMENTS

2017/0103557 A1* 4/2017 Kumar .................... G06T 11/60
2018/0260984 A1* 9/2018 Severenuk .............. G06F 3/016
2019/0258893 A1* 8/2019 Jain ........................ G06T 5/002

OTHER PUBLICATIONS

Li et al., Photo-Sketching: Inferring Contour Drawings from Images, 2019 IEEE Winter Conference on Applications of Computer Vision, 2019, pp. 1403-1412, arXiv:1901.00542, //doi.org/10.48550/arXiv.1901.00542.*

Li et al., Im2Pencil: Controllable Pencil Illustration from Photographs, CVPR 2019, 2019, pp. 1525-1534, arXiv:1903.08682, //doi.org/10.48550/arXiv.1903.08682.*

Berger, Style and Abstraction in Portrait Sketching, ACM Trans. Graph. 32, 4, Article 55 (Jul. 2013), 2013, pp. 55:1-55:12, //doi.acm.org/10.1145/2461912.2461964.*

* cited by examiner

PREVIEWING AND GENERATING STROKE OUTLINES IN ASSOCIATION WITH IMAGES

BACKGROUND

Artists use inspiration for their sketches from anywhere. Sometimes, artists use real-world images or video feeds for inspiration. A mobile device allows the artist to transfer real-world inspirations into the digital world by creating an outline of objects in the real-world images. In some cases, artists and other people desire to generate strokes or a clean, hand-traced version of the real-world image. A stroke outline, in one example, creates a line art that traces an outline of an image. Conventional methods that attempt to generate stroke outlines for an image have drawbacks. For example, certain conventional methods are time consuming and resource intensive. In this regard, an iterative process is oftentimes applied to result in a desired stroke outline. For instance, based on an initial poorly-captured image or inaccurate or incomplete desired stroke outlines generated via conventional technologies, the process may be initiated multiple times in an attempt to obtain a more refined stroke outline.

SUMMARY

Embodiments of the present disclosure related to, among other things, a system and method to efficiently and effectively preview and capture stroke outlines from real-world images and/or video feeds. In particular, embodiments described herein provide a preview of a candidate stroke outline image generated from an input image (e.g. a static image from a database, a live video feed, or a non-live video feed from a database etc.). Such a preview is presented to the user, for example, via the user device, such that the user can view a general representation of a stroke outline image that may be generated if so desired. Such a preview enables flexibility of experimenting with the image and/or video feed in order to capture a desired stroke outline image. Further, embodiments described herein obtains stroke outline images generated via different data processing techniques. For example, a detailed stroke outline image can be generated for the input image using one data processing technique, while an alternative stroke outline image can be generated for the input image using another data processing technique. One of the stroke outline images can then be used to enhance or modify the other stroke outline image, thereby providing a quality stroke outline for subsequent use by the user. As one example, the alternative stroke outline image is modified based on the detailed stroke outline image. In embodiments, the modified stroke outline image is further processed to improve the stroke outline image. Such an improved stroke outline image can be presented to the user.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present technology is described in detail below with reference to the attached drawing figures, wherein.

DETAILED DESCRIPTION

Individuals, such as artists, may generate sketches or artistic work using real-world images for inspiration. As such, in some cases, individuals may desire to transfer an aspect(s) of a real-word image to the digital world. To do so, a user may generate a stroke outline from camera images to use in subsequent artwork. Generating a stroke outline, however, is very tedious and resource intensive.

In particular, with conventional implementations, a well-captured image is typically beneficial. In this regard, a user (e.g., an artist) may need to ensure that the image is not blurry, has good exposure, and has appropriate lighting in order for a decent stroke outline image to be generated. Further, the desired object may need to be analyzed to ensure that the object of focus is not obscured by any shadows. Upon obtaining a well-captured image, conventional technologies generally include image editing to clean the image background and remove unwanted content from the object of focus. Image filters can then be applied to find edges within the image (e.g., run a Sobel filter and a levels adjustment filter), which can then be hand traced to generate a stroke outline image, or portion thereof. Such a process is time consuming and resource intensive.

Further, oftentimes, an initially generated stroke outline image is not satisfactory. For example, a generated stroke outline image can have unwanted stroke lines, missing details, and incomplete or broken stroke outlines. In such cases, additional time and resources are put forth to manually modify, edit, and/or hand trace over the stroke outlines for a final desirable output. For example, in instances in which a user (e.g., artist) is not happy with an initially generated stroke outline image, to the user may need to change the image, modify the angle or lighting associated with the image, or capture a new image, perform various processing steps in light of the modified image, and perform the outline trace to generate a new or updated stroke outline image. Such an iterative process can be tedious, tine consuming, and computing resource intensive.

Further, in some cases, an opportunity may not exist to capture a new desired image when an initial unsatisfactory stroke outline is initially generated. For example, assume an initial image capture is transitory, such as an image of a bird perched on a tree. In such cases, a user may not have the opportunity to go back and recapture the shot if an unsatisfactory stroke outline image is generated.

Figure 1:
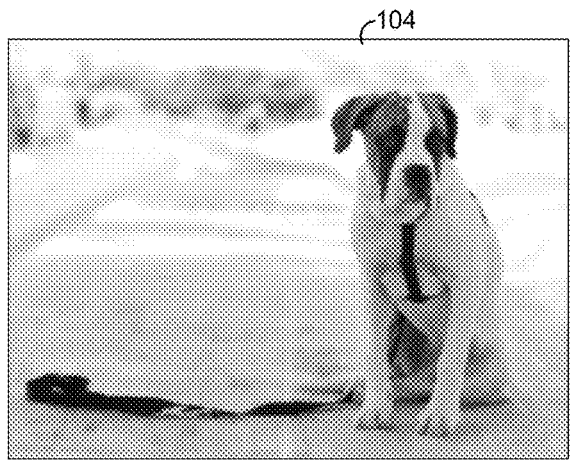
FIG. 1 are exemplary stroke outline images from conventional methods.
Figure 1:
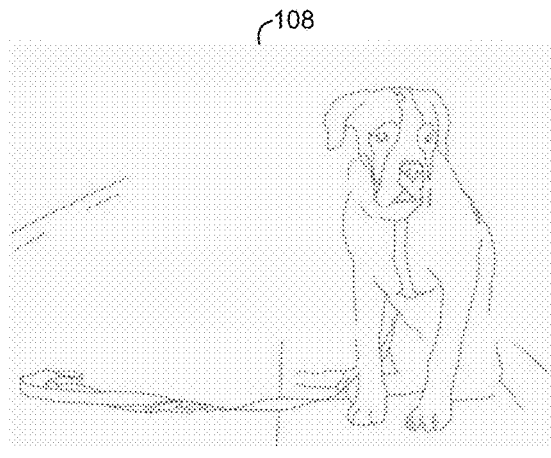
Figure 1:
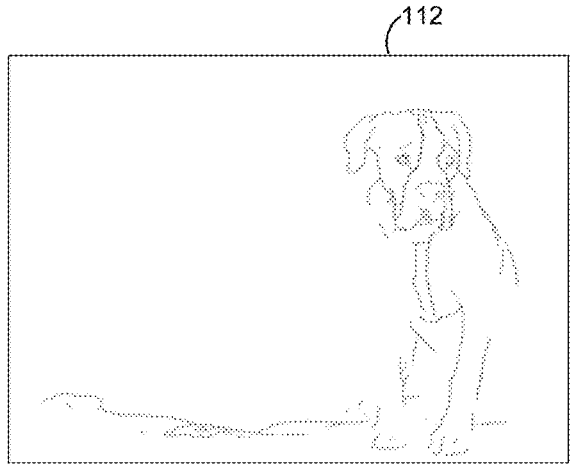
Figure 1:
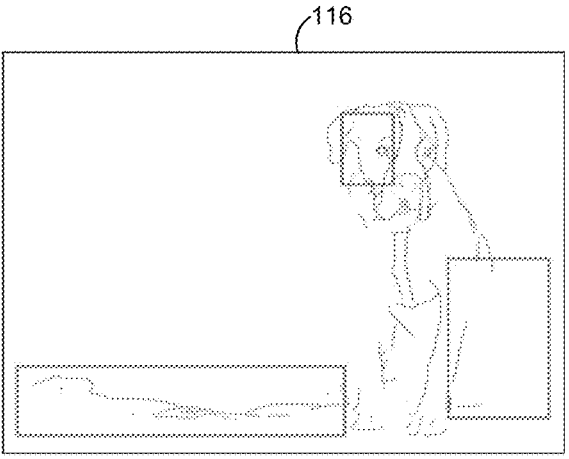
Figure 1:
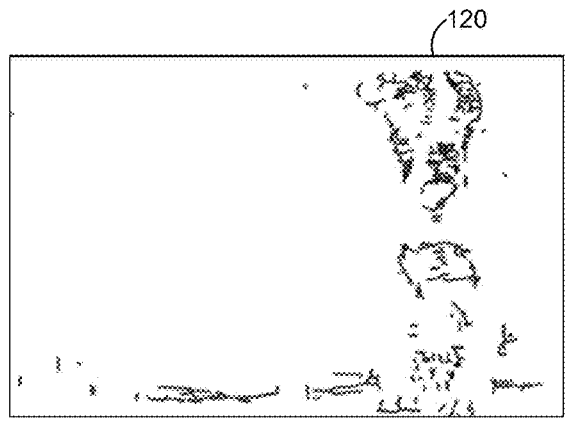

FIG. 1 provides example stroke outline images generated using conventional implementations. Assume an initial image 104 is captured and that a user (e.g., artist) desires a stroke outline of the dog illustrated in image 104. In such a case, the user may desire the output stroke outline image to look similar to the image 108. As shown, image 108 includes a stroke outline image of the dog in image 104 that has complete lines, is not blurry, and does not include minor details like the blurry background. However, using conventional implementations can result in undesired image as illustrated in images 112 and 120. In particular, such images include aspects that are blurry, incomplete lines, and does not provide a clean output of a desired stroke outline, as illustrated in image 116. Furthermore, these conventional processes can be time consuming, often requiring the artist to clean the image before processing to remove unwanted objects, shadows, background, noise, improve lighting, or the like and/or clean the image after processing to remove blurriness or noise and manually hand draw over broken lines from the stroke outline image. As illustrated in FIG. 1, the stroke outline image in images 112 and 120 are far from the artist's expectation in image 108.

Accordingly, embodiments of the present disclosure are directed to employing techniques to efficiently and effectively generate stroke outline images, or drawings, including one or more objects captured in images, live video feeds, and/or a non-live video feed. At a high level, embodiments described herein provide a preview of a candidate stroke outline image generated from an input image (e.g., a static image from a database, images from a live video feed, or images from a non-live video feed from a database etc.). Such a preview is presented to the user, for example, via the user device, such that the user can view a general representation of a stroke outline image that may be generated if so desired. Such a preview enables flexibility of experimenting with the image, non-live video feed and/or live video feed in order to capture a desired stroke outline image. Further, embodiments described herein obtains stroke outline images generated via different data processing techniques. For example, a detailed stroke outline image can be generated for the input image using one data processing technique, while an alternative stroke outline image can be generated for the input image using another data processing technique. One of the stroke outline images can then be used to enhance or modify the other stroke outline image, thereby providing a quality stroke outline for subsequent use by the user. As one example, the alternative stroke outline image is modified based on the detailed stroke outline image. In embodiments, the modified stroke outline image is further processed to improve the stroke outline image. Such an improved stroke outline image can be presented to the user.

In a particular operation, to perform previewing and capturing of a stroke outline, an input image, for example, associated with a video feed is initially obtained. A first process, which may also be referred to as a real-time preview process or a real-time preview Graphic Processing Unit (GPU) pipeline, efficiently processes the image to provide a stroke outline preview of the input image. In embodiments, the graphic processing unit is a powerful parallel processor. Such a stroke outline preview is presented to the user, via a user device. In accordance with the user selecting to capture or use image for generating a stroke outline image, multiple processes may be used to generate different stroke outlines according to the difference processes. For example, a first process, also referred to as a detailed stroke outline process, generates a detailed stroke outline image. Such a process may be part of the data processing pipeline that generated the stroke outline preview (e.g., the real-time preview GPU pipeline). A second process, also referred to as an alternative process, generates an alternative stroke outline image. In some cases, an alternative stroke outline image is received from another component or system that generates the alternative stroke outline image via the alternative process. In some embodiments, the process to generate a detailed stroke outline image and the process to generate the alternative stroke outline are performed in parallel. Upon generating the different stroke outline images, the stroke outline images can be compared and used to modify one of the stroke outline images to enhance the stroke outline contained therein. In embodiments, such modifications include comparing, combining, and/or merging stroke outlines from the detailed stroke outline image generated using the detailed stroke outline process to modify the alternative stroke outline image. The modified alternative stroke outline can be further enhanced or modified by the user and/or system, for example, to remove any variation or discrepancies in the modified alternative stroke outline. Thereafter, the final stroke outline image is generated and/or provided to the user for presentation.

Figure 2A:
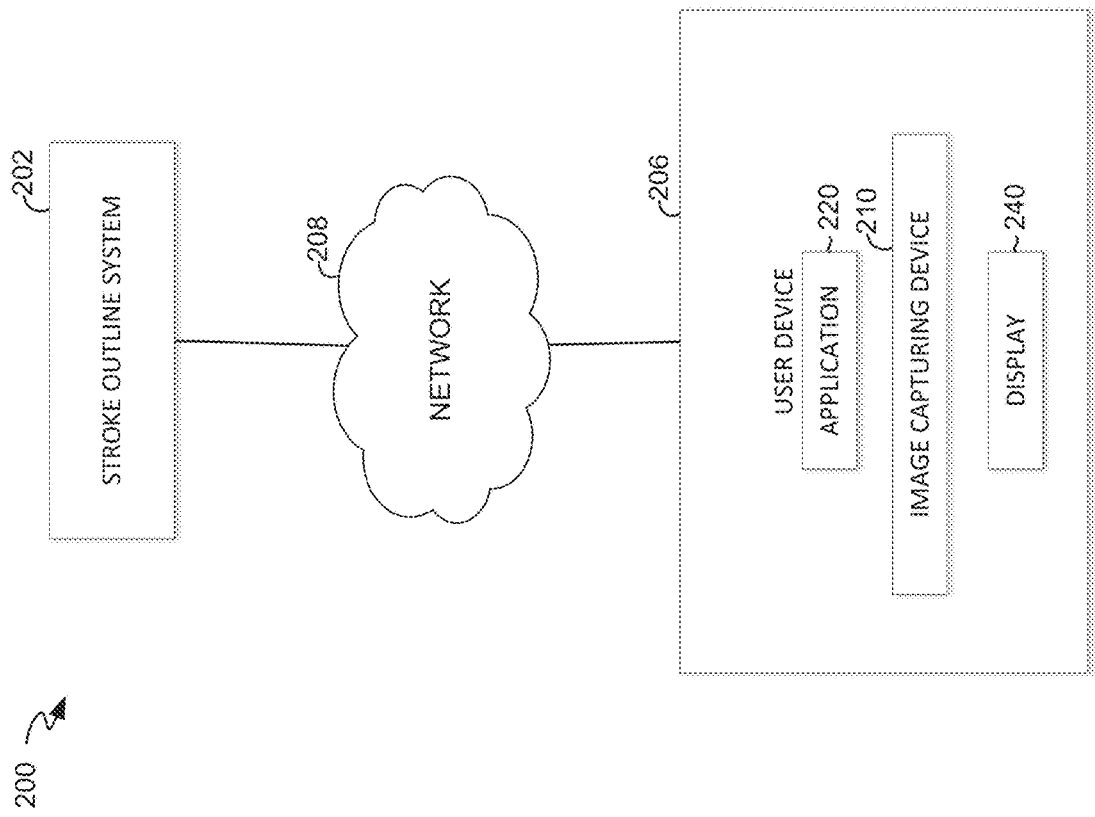
FIG. 2A is a diagram of an environment that can be used to perform the preview and capture stroke outline method, according to embodiments of the present disclosure.

Turning to FIG. 2A, FIG. 2A is a diagram of an environment 200 that can be used to perform the preview and capture stroke outline method, according to embodiments of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 6.

The system 200 is an example of a suitable architecture for implementing certain aspects of the present disclosure. In one embodiment, the system 200 includes, among other components not shown, a stroke outline system 202, and a user device 206. Each of the stroke outline system 202 and user device 206 shown in FIG. 2A can comprise one or more computer devices, such as the computing device 600 of FIG. 6 discussed below. The stroke outline system 202 may be embodied at least partially by the instructions corresponding to application 220. Therefore, the stroke outline system 202 can operate on a server or on a user device, such as user device 206, or partially on multiple devices. As shown in FIG. 2A, the stroke outline system 202 and the user device 206 can communicate via a network 208, which may include, without limitation, one or more local area networks (LANs) and/or wide area networks (WANs). Such networking environments are commonplace in offices, enterprise-wide computer networks, intranets, and the Internet. It should be understood that any number of user devices and stroke outline systems may be employed within the system 200 within the scope of the present disclosure. Each may comprise a single device or multiple devices cooperating in a distributed environment. For instance, the stroke outline system 202 could be provided by multiple devices collectively providing the functionality of the stroke outline system 202 as described herein. Additionally, other components not shown may also be included within the network environment.

It should be understood that any number of user devices 206, stroke outline systems 202, and other components can be employed within the operating environment 200 within the scope of the present disclosure. Each can comprise a single device or multiple devices cooperating in a distributed environment.

User device 206 can be any type of computing device capable of being operated by a user. For example, in some implementations, user device 206 is the type of computing device described in relation to FIG. 6. By way of example and not limitation, a user device 206 may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user device 206 can include one or more processors, and one or more computer-readable media. The computer-readable media may include computer-readable instructions executable by the one or more processors. The instructions may be embodied by one or more applications, such as application 220 shown in FIG. 2A. Application 220 is referred to as a single application for simplicity, but its functionality can be embodied by one or more applications in practice. As indicated above, the other user devices can include one or more applications similar to application 220.

The application(s) may generally be any application capable of facilitating performance of previewing and capturing stroke outlines (e.g., via the exchange of information between the user devices and the stroke outline system 202). In some implementations, the application(s) comprises a web application, which can run in a web browser, and could be hosted at least partially on the server-side of environment 200. In addition, or instead, the application(s) can comprise a dedicated application, such as an application having image processing functionality. In some cases, the application is integrated into the operating system (e.g., as a service). It is therefore contemplated herein that "application" be interpreted broadly.

In accordance with embodiments herein, the application 220 can either initiate the stroke outline system 202 to facilitate preview and capture stroke outline method via a set of operations initiated to display the stroke outline preview image and/or the final stroke outline image on a display 240 of to the user device 206. In certain embodiments, the user device 206 or the application 220 uses the image capturing device 210 to transfer and/or capture a live video feed or live image for which to perform previewing and capturing of a stroke outline. A live video feed refers to a streaming of content that is transferred from the camera of an image capturing device 210 to the display 240 of the user device 206. In the live video feed, there may be a slight delay before the streaming content is transferred from the camera to the display 240. The image capturing device 210 can be used to capture a live image from the live video feed. For example, a user can use the user device 206 to capture a live image from the live video feed from a camera of the image capturing device 210. The live image is captured from one of the frames of the live video feed. A live image is one frame out of the live video feed. Although the image capturing device 210 is illustrated as part of the user device 206, in other embodiments, the image capturing device 210 may be remote from the user device. The display 240 can be used to display a static image stored in a server or database. The display 240 can also be used to display a non-live video feed that is not live but instead has been previously recorded and stored in a server or database. For example, the non-live video feed can be a video that was previously recorded and/or created. The user device 206 can be used to select a static image out of the non-live video feed. The static image from the non-live video feed is a frame that is selected from the non-live video feed.

In embodiments, the stroke outline system 202 obtains an image(s), for example, via the image capturing device 210 or application 220 or a database or server, for processing by the stroke outline system 202. In particular, the stroke outline system 202 performs various processes to facilitate previewing and capturing stroke outlines, in accordance with embodiments described herein. At a high level, and as described in more detail herein, the stroke outline system can implement multiple data processing pipelines to facilitate previewing and capturing of stroke outlines for input images. As described, an input image (e.g. a static image from a database, images from a live video feed, or images from a non-live video feed from a database etc.) prior to a selected image being selected and/or capturing (e.g., a user selection to capture the image from the image capturing device 210). The live video feed refers to a live streaming of content that is transferred from the camera of an image capturing device 210 to the display 240. A user can use the user device 206 to capture a live image from the live video feed. The live image is captured from one of the frames of the live video feed. The static image refers to an image stored in the database and/or server. A non-live video feed refers to a video feed stored in database and/or server. A user can use the user device 206 to select a static image. The user can also use the user device to select an image frame from the non-live video feed. This image frame will be a static image selected from one of the frames of the non-live video feed. A first data processing pipeline enables a stroke outline preview as well as generation of a detailed stroke outline image from the input image. A stroke outline image is an image consisting of lines and curves outlining one or more objects. With regard to generating the stroke outline preview, this real time preview enables generation and provision of raster outlines that overlay the image in real time. Advantageously, a user may view the stroke outline preview before electing to capture the image such that the image capturing can be performed in the most effective manner. For example, assume the preview is not outputting a desired stroke outline preview, the user can reconfigure the positioning of the camera or settings of the camera to obtain a more desired stroke outline preview. Advantageously, presenting the stroke outline preview enables adjustments to be made in association with image capturing such that an iterative process is less likely needed to generate a desired stroke outline image. The data processing pipeline to generate the stroke outline preview is thorough enough to provide a quality preview, but also efficient enough to present in real time (e.g., to generate 30 frames per second).

In accordance with a user capturing an image (e.g., based on a user's assessment of the stroke outline preview), more detailed stroke outline are generated. As described, the first data processing pipeline also generates a detailed stroke outline image. In this regard, additional processes or steps may be applied in addition to those used to generate the stroke outline preview to generate a detailed stroke outline image. In addition to using the first data processing pipeline to generate a detailed stroke outline image, a second data processing pipeline is also applied to generate an alternative stroke outline image generated by the second data processing pipeline, or alternative process. As one example, the alternative process is a conventional method, or another method, that is used to generate stroke outline images. The processes to generate a detailed stroke outline image (e.g., via a first data processing pipeline) and the process to generate the alternative stroke outline (e.g., via a second data processing pipeline) can be performed in parallel. Although only two data processing pipelines are generally discussed herein, any number of data processing pipelines may be employed in accordance with embodiments described herein. Advantageously, using multiple data processing pipelines to generate stroke outline images enables a user to be presented with options generated via different technologies such that the most optimal or highest quality stroke outline image is generated. Further, although one data processing pipeline is described herein as including processing aspects related to generating a stroke outline preview image and a detailed stroke outline, as can be appreciated, separate data processing pipelines, or multiple data processing pipelines may be used to perform such functionality.

In embodiments, the stroke outline system 202 modifies a stroke outline image generated via one data processing pipeline using aspects of a stroke outline image generated via another data processing pipeline. As one example, the stroke outline system 202 modifies the alternative stroke outline image by adding, removing, and/or modifying stroke outlines in the alternative stroke outline image based on the detailed stroke outline image. The stroke outline system 202 can further process a modified image (e.g., one stroke outline image modified using aspects of another stroke outline image) to remove variances between stroke outlines developed by multiple technologies or improve other aspects of the image. As such, the stroke outline system 202 outputs a final stroke outline image that efficiently and effectively provides a desired outline of an object(s). The final stroke outline image can be known as an improved stroke outline image, at least in part, because it is an improvement of one output generated via one data processing pipeline based on another output generated via another data processing pipeline.

For cloud-based implementations, the instructions on stroke outline system 202 may implement one or more aspects of the stroke outline system 202, and application 220 may be utilized by a user and/or system to interface with the functionality implemented on server(s). In some cases, application 220 comprises a web browser. In other cases, stroke outline system 202 may not be required. For example, the functionality described in relation to the stroke outline system 202 can be implemented completely on a user device, such as user device 206.

These components may be in addition to other components that provide further additional functions beyond the features described herein. The stroke outline system 202 can be implemented using one or more devices, one or more platforms with corresponding application programming interfaces, cloud infrastructure, and the like. While the stroke outline system 202 is shown separate from the user device 206 in the configuration of FIG. 2A, it should be understood that in other configurations, some or all of the functions of the stroke outline system 202 can be provided on the user device 206.

Figure 2B:
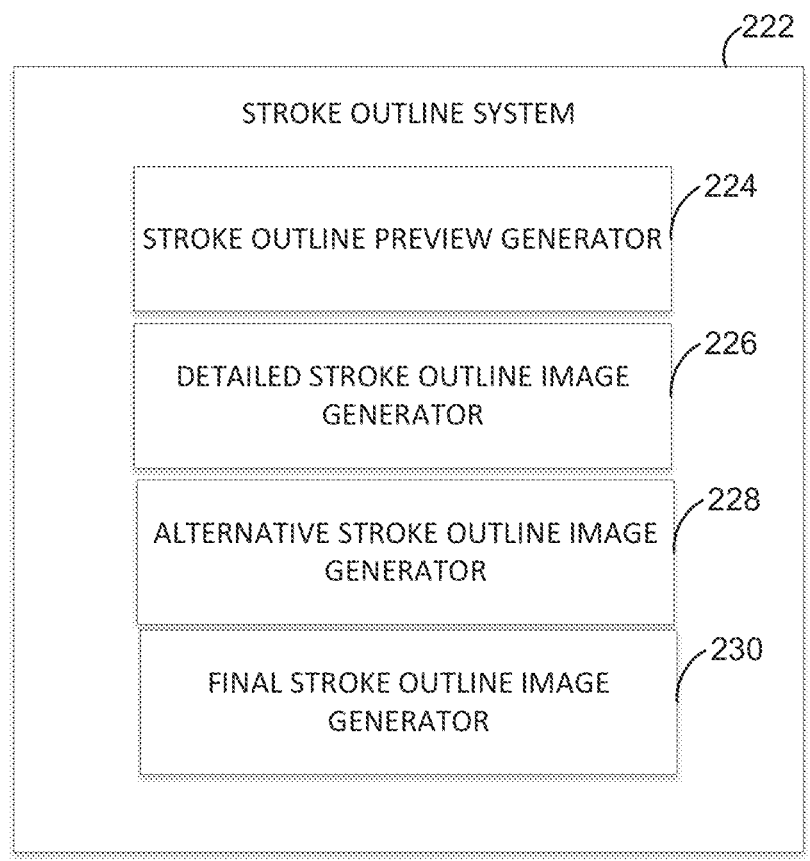
FIG. 2B provides an example stroke outline system, in accordance with embodiments described herein.

Turning to FIG. 2B, FIG. 2B provides an example stroke outline system 222. As shown, example stroke outline system 222 includes a stroke outline preview generator 224, a detailed stroke outline image generator 226, an alternative stroke outline image generator 228, and a final stroke outline image generator 230. As can be appreciated, any number of components may be used to perform the various functionalities described herein.

In accordance with the stroke outline system obtaining an input image (e.g. a static image from a database, images from a live video feed, or images from a non-live video feed from a database etc.), the stroke outline preview generator 224 is generally configured to generate a stroke outline preview. A stroke outline preview, in one example, is a preview of a stroke outline image that may be generated if so desired (e.g., the user selects the image or otherwise indicates a desire to use the image). Upon generating a stroke outline preview, the preview can be presented to the user (e.g., via a display screen) to illustrate location and positions of a stroke outline (e.g., in the form of raster outlines). To generate a stroke outline preview, a process that performs efficiently may be used such that the preview can be rendered in real time, that is, as the user device continues to move. For example, a process may be performed to run for a video feed (e.g. 30 frames per second) or a single static image. In one embodiment, such a data processing pipeline includes performing bilinear scaling, bilateral filtering, RGB to luminance filtering, Sobel edge detection filtering, and levels adjustment filtering (e.g., using a lower threshold value), as described in more detail below. Using such a filter process, a stroke outline consisting of raster outlines of one or more objects in an image can be simulated as preview for any given video feed frame or real world image.

The detailed stroke outline image generator 226 is generally configured to generate a detailed stroke outline image. In one example, a detailed stroke outline image is a stroke outline image generated via a particular process, also referred to herein as a detailed process. In some embodiments, the detailed stroke outline image generator 226 uses, or is part of, the data processing pipeline that generated the stroke outline preview. In this regard, the process used for generating the stroke outline preview and the detailed stroke outline image can include many similar or same filters. In one embodiment, a detailed process used to generate a detailed stroke outline image includes performing bilinear scaling, bilateral filtering, RGB to luminance filtering, Sobel edge detection filtering, and levels adjustment filtering (e.g., using a higher threshold value), Gaussian blur filtering, binary threshold filtering, and median filtering, as described in more detail below.

The alternative stroke outline image generator 228 is generally configured to generate an alternative stroke outline image. In one example, an alternative stroke outline image is a stroke outline image generated via a particular process different than that used to generate the detailed stroke outline image. Such a process may be referred to herein as an alternative process. In embodiments, the alternative stroke outline image generator 228 may perform in parallel or concurrently with the detailed stroke outline image generator 226. Such an alternative process may be any process different from that of the detailed process. In some cases, the alternative processes uses known implementations or new processes to generate alternative stroke outline images.

The detailed stroke outline image generator 226 and/or the alternative stroke outline image generator 228, in embodiments, are triggered based on an indication received in association with a stroke outline preview or based on a selection or capturing of an image.

The final stroke outline image generator 230 is generally configured to generate a final stroke outline image. Such a final stroke outline image is generally presented to the user for subsequent use. To generate a final stroke outline image, the final stroke outline image generator 226 may compare the detailed stroke outline image and the alternative stroke outline image, and/or use one of such stroke outline images to enhance or improve the other. In this regard, aspects of one stroke outline image can be used to modify the other stroke outline image to output an improved final stroke outline image. Various modifications may include using portions of one image to fill or complete portions of another image. Further, the final stroke outline image generator 230 may further enhance aspects of the modified stroke outline image, for example, to refine strokes for completeness, consistency, etc.

Figure 3:
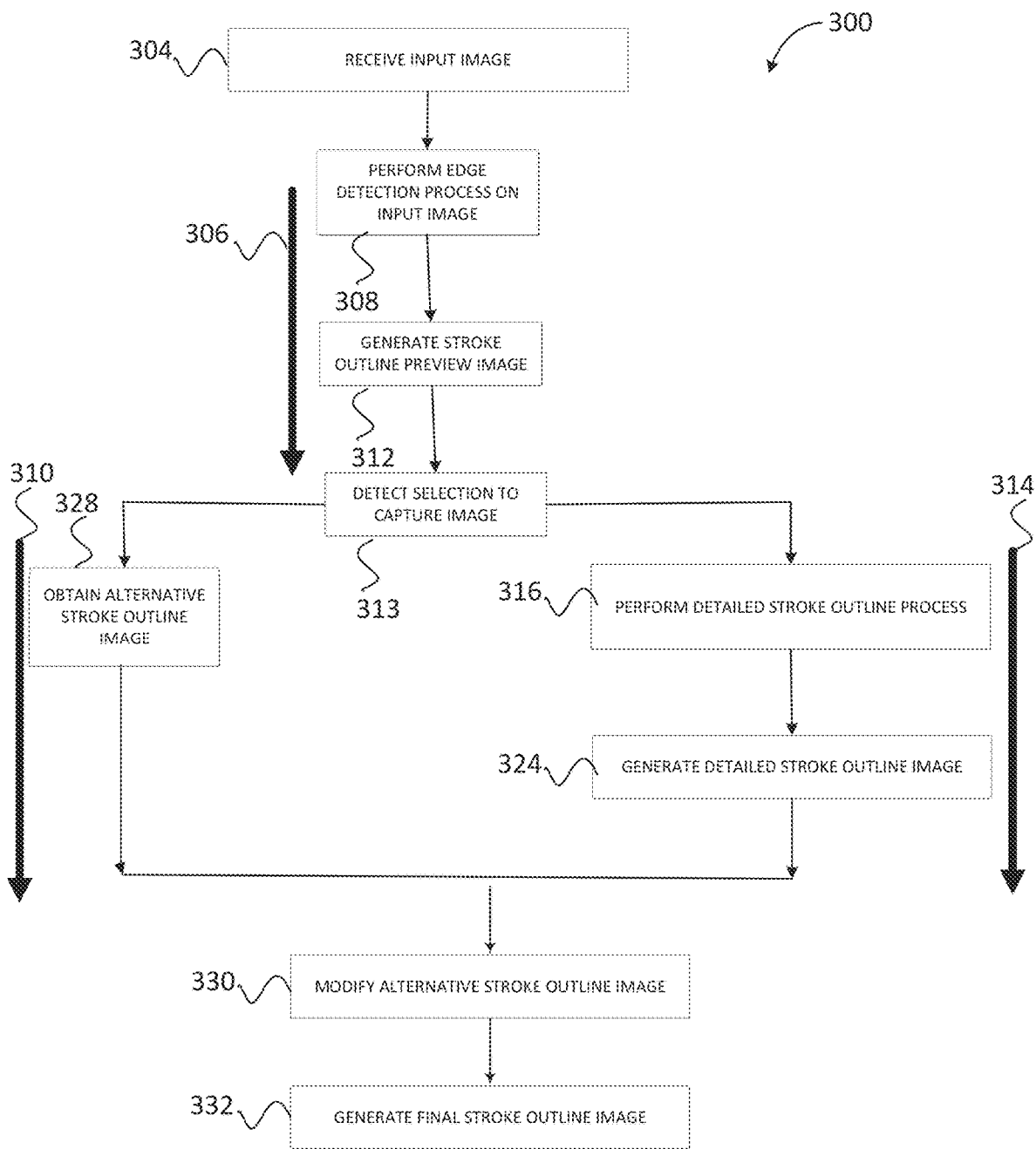
FIG. 3 is a flow diagram illustrating an exemplary method for implementing preview and capture of stroke outlines in accordance with one embodiment of the present disclosure.
Figure 5:
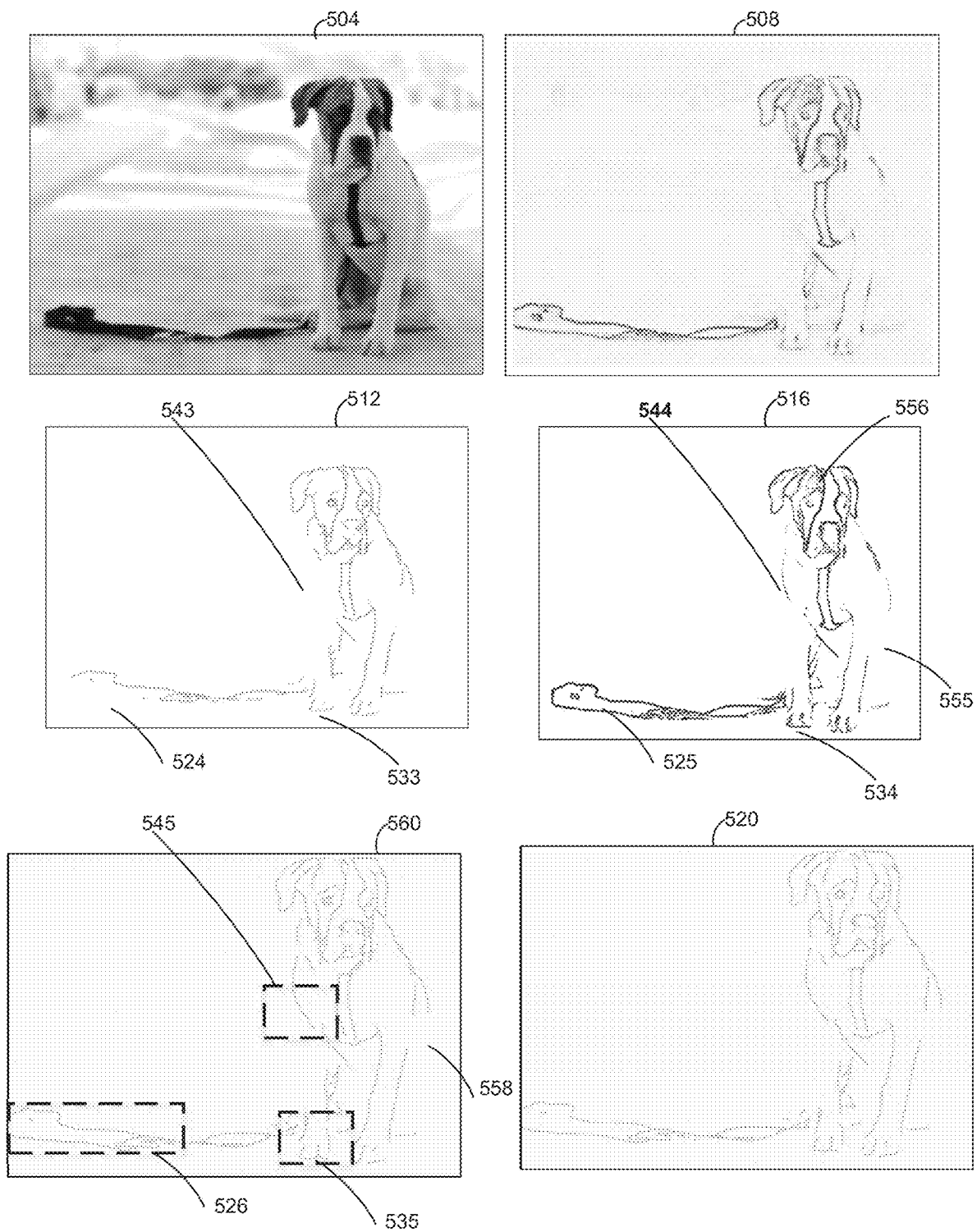
FIG. 5 are images illustrating one embodiment preview and capture of stroke outline method in accordance to one embodiment of the present disclosure.

With reference to FIG. 3 and FIG. 5, FIG. 3 is a flow diagram illustrating an exemplary method 300 for facilitating preview and capture of stroke outlines in accordance with one embodiment of the present disclosure. FIG. 5 provides images illustrative of aspects described herein. A processing device such as a user device, a server, a cloud computing service or the like implements the exemplary method 300. The stroke outline system can initiate the preview and capture of stroke outline method 300 as described herein.

As shown in FIG. 3, in one embodiment, at block 304, a stroke outline system receives an input image (e.g. a static image from a database, images from a live video feed, or images from a non-live video feed from a database etc.). In some embodiments, the received image is images from a live video camera feed generated via a user device, such as user device 206 of FIG. 2. In some embodiments, the received image can be images from a non-live video feed. The non-live video feed can be a video that was previously recorded and/or created. The non-live video feed can be stored in a database and/or server. In some embodiments, the received image can be a static image from a database and/or server.

In accordance with obtaining an input image, the stroke outline system performs a first process 306. The first process 306 can be a real-time preview GPU pipeline that generates a stroke outline preview from the input image. Generally, the method 300 during the first process 306 quickly generates preview of a stroke outline image. The stroke outline preview image is generated to provide a user with quick feedback of a sample or potential stroke outline image that may be captured. This can be useful as a user and/or system is trying to capture a scene or trying to decide which image to capture from a live-feed seen from a camera, or the like. It can also be useful when a user is trying to decide which image from a previously recorded video (non-live video) to use for generating a final stroke outline image. It can also be useful when a user is trying to decide which static image from a database of images to use for generating a final stroke outline image. Further, generating and providing such a preview allows the user and/or system to perform more experimentation while trying to capture or select the image to perform the preview and capture stroke outlines method on. As the stroke outline preview image is generated in an expedient manner (such that it can be presented in real time and as the user moves the image capturing components), in some cases, the stroke outline preview image is not of a highest quality and, as such, can have noise, minor unwanted details, incomplete lines, or the like.

As part of the first process 306, the stroke outline system, at block 308 performs an edge detection process on the input image. In one example, an edge detection software or filter(s) can be used to perform the edge detection process at block 308. For example, a Sobel filter is used on the image to perform edge detection. It should be understood that any other filters or software or methods can be used to perform edge detection.

In some embodiments, the edge detection process on the input image at block 308 includes performing bilinear scaling, a bilateral filtering, Sobel filtering, and levels adjustment filtering. The bilateral filter is used to, among other things, smoothen regions. The Sobel filter is used to, among other things, detect edges. The levels adjustment filter is used to, among other things, fix texture tones. It should be understood that these filters can be used for other reasons or to provide other results as well.

In some embodiments, the edge detection process on the input image at block 308 performs any combination of the following functions: rescaling, region smoothening, color conversion, edge detection, and fixing texture tones. For example, the method 300 uses any combination of the following filters: a bilinear scaling filter to rescale the texture, a bilateral filter to smoothen the region, a RGB color to luminance conversion filter for color conversion, a Sobel edge detection filter for edge detection, and a levels adjustments filter to fix texture tones (e.g., using a low threshold value). It should be understood that these filters can be used for other reasons or to provide other results as well. It should be understood that any other filter or software can be used and in any order. A filter is a software or a processing unit that receives as image and processes the image based on logic or algorithm or machine learning algorithms or the like. A description of the filters that can be used is discussed below:

With regard to bilinear scaling filtering, at block 308 during the first process 306, when the method 300 uses a bilinear scaling filter, a bilinear texture scaling filter, or a bilinear texture rescaling filter, it allows the method 300 to make the texture size of the image smaller. This filter can be used to down scale the image, thereby improving the response time of the processes 306 (and process 314). In one example, a scaling value of ½ can be used which may help in reducing hardware noises.

With regard to bilateral filtering, at block 308 during the first process 306, when the method 300 uses a bilateral filter, it allows the method 300 to smoothen the image, enhance the edges of the image, or reduce noise within the image. It should be understood that any other filter or software can be used to smoothen the image. Bilateral filter is a non-linear, edge preserving, and/or noise reducing smoothening filter for the images.

With regard to RGB to luminance filter, at block 308 during the first process 306, when the method 300 performs color conversion by using a RGB to luminance filter, it allows the method 300 to convert the RGB channel of each pixel to a single luminance value. For example, it converts the image to a grey scale. Since the final stroke outline image displays black outlines, converting the RGB channel of each pixel to single luminance value allows the method to reduce computation need.

With regard to Sobel filtering, at block 308 during the first process 306, when the method 300 performs edge detection filtering using a Sobel Filter, it can detect edges. For example, a Sobel-Feldman operator can be used for each of the pixel.

With regard to a levels adjustment filter, at block 308 during the first process 306, when the method 300 fixes texture tones using a levels adjustment filter, it can allow the method 300 to correct the tonal range and color imbalance of the image by adjusting the intensity levels of the image shadows, mid-tones, highlights, or the like. Such a filter can convert an image with gray scale to an image with lesser shades to generate a cleaner image. The levels adjustment filter can be used to adjust the grey scale content in the processed frame. When the method 300 uses a levels adjustment filter during the first process 306, in some embodiments, it uses a lower threshold which means that the white and black shades are at a wider range. Such a lower threshold may be used to increase the speed of the first process 306. In some embodiments, the output levels is fixed at 0 (indicating pure black color) and 255 (indicating pure white color), and the mid tones is fixed at 0.7 with low and high-end tones evenly spaced with difference of 0.15 value (if considering a normalized scale value from 0-1).

In continuation of the first process 306 (real-time preview GPU pipeline), the stroke outline system, at block 312 generates a stroke outline preview image. With further reference to FIG. 5, the method 300 generates and provides a preview as illustrated in image 508. Using any combination of filters or software in block 308 allows the method 300 to generate a preview 508 of an input image 504 (e.g. a static image from a database, images from a live video feed, or images from a non-live video feed from a database etc.). The stroke outline preview image 508 is not complete, but provides a quick feedback of the stroke outline that can be expected from performance of the method 300.

Advantageously, the stroke outline preview image allows the user and/or system to change the angle of the camera, change settings in the camera, change the objects in the shot, change the lighting from the camera, and/or select another image from memory, among other things, in order to capture a more desirable stroke outline image.

When the user is satisfied with the details provided in the stroke outline preview image, the user may select to capture the image for subsequent use in generating stroke outline image. As such, as shown at block 313, the stroke outline system can detect a selection to capture the image, or other indicator that a particular image should be used to generate a stroke outline image.

In accordance with detecting a selection to capture an image, process 314 and/or process 310 can be initiated. Any of processes 306, 310, and 314 can be performed in parallel. As one example, processes 310 and 314 are initiated upon detection of a captured image. In other cases, processes 306 is performed in parallel with process 310 and/or 314.

Turning to process 314, process 314 may be referred to as a detailed stroke outline GPU pipeline. In some embodiments, the process 314 performed by method 300 is performed in parallel to the alternative process 310. Generally, the process 314 performs a detailed stroke outline process on the selected image at block 316. In one example, the process 314 generates a detailed stroke outline image by performing more image processing on the selected image than the first process 306 does on the input image. In this regard, in some implementations, the process 314 can be thought of as part of the data processing pipeline that continues with regard to process 306. In one example, at block 316, to perform a detailed stroke outline process, the stroke outline system uses the following filters during the process 314: a bilateral filter, a Sobel filter, and a median filter, for example, in that order. In another example, the stroke outline system uses the following filters during the process 314: a bilateral filter, a Sobel filter, a binary threshold filter, and a median filter. For example, the bilateral filter can be used to smoothen regions, the Sobel filter can be used to detect edges, the binary threshold filter can be used to generate plain binary images, and a median filter can be used to remove noise. It should be understood that these filters can be used for other reasons or to provide other results as well.

In one example, the method 300 uses any combination of the following filters during the process at block 316: a bilinear scaling filter to rescale the texture, a bilateral filter to smoothen the region, a RGB color to luminance conversion filter for color conversion, a Sobel edge detection filter for edge detection, a levels adjustments filter to fix texture tones (e.g., with a high threshold value, such as a higher threshold value than the threshold value used during the edge detection process during the first process 306 at block 308), a Gaussian blur filter can be used to remove noise artifacts or to correct tonal range and color imbalance, a binary threshold filter can be used to generate plain binary images and a median filter can be used to remove impulsive or salt-pepper noise. Plain binary images include pixels that are either black or white and don't include pixels having any colors in the grey scale. In some embodiments, the binary threshold filter receives an input image and analyzes each pixel such that if the intensity value of pixel is greater than a threshold value, the corresponding pixel in output image is marked as black otherwise the corresponding pixel is marked as white. It should be understood that these filters can be used for other reasons or to provide other results as well. It should be understood that any other filter or software can be used and in any order. A description of the filters that can be used is discussed below:

With regard to bilinear texture, at block 316 during the second process 314, when the method 300 uses a bilinear scaling filter, a bilinear texture scaling filter, or a bilinear texture rescaling filter, it allows the method 300 to make the texture size of the image smaller. This filter can be used to down scale the image. This can allow the stroke outline system to improve the response time of the processes 306 and/or 314. In one example, a scaling value of ½ can be used which may help in reducing hardware noises.

With regard to a bilateral filter, at block 316 during the second process 314, when the method 300 uses a bilateral filter, it allows the method 300 to smoothen the image or enhance the edges of the image or reducing noises of the image. It should be understood that any other filter or software can be used to smoothen the image. Bilateral filter is a non-linear, edge preserving and noise reducing smoothening filter for the images.

With regard to RGB to luminance filter, at block 316 during the second process 314, when the method 300 performs color conversion by using a RGB to luminance filter, it allows the method 300 to convert the RGB channel of each pixel to a single luminance value. For example, it converts the image to a grey scale. Since the final stroke outline image displays black outlines, converting the RGB channel of each pixel to single luminance value allows the method to reduce computation need.

With regard to a Sobel filter, at block 316 during the second process 314, when the method 300 performs edge detection filtering using a Sobel filter, it can detect edges. For example, a Sobel-Feldman operator can be used for each of the pixel.

With regard to a levels adjustment filter, at block 316 during the process 314, when the method 300 fixes texture tones using a levels adjustment filter, it can allow the method 300 to correct the tonal range and color imbalance of the image by adjusting the intensity levels of the image shadows, mid-tones, highlights, or the like. It can convert an image with gray scale to an image with lesser shades to generate a cleaner an image. The levels adjustment filter can be used to adjust the grey scale content in the processed frame. When the method 300 uses a levels adjustment filter during the process 314, it uses a higher threshold value than the threshold value used during the first process 306. Using a higher threshold value allows the white and black shades to be of a shorter range. A higher threshold value reduces the details of shades in the image. This is because the second process need not as quick as the first process, however the second process needs to generate a cleaner output than the first process 306. In some embodiments, the output levels are fixed at 0 (pure black color) and 255 (pure white color), and the mid tones are fixed at 0.7, with low and high end tones evenly spaced with difference of 0.15 value (considering normalized scale values of 0-1). This configuration is different from the first process 306, but need not be.

With regard to Gaussian blur filtering, at block 316 during the second process 314, when the method 300 uses a Gaussian blur filter, it can remove noise artifacts. It can also reduce the image quality at a few areas in the image, but using the Gaussian blur filter in conjunction with the threshold filter can provide sharp outlines that can be used for the detailed stroke outline image.

With regard to binary threshold filtering, at block 316 during the second process 314, when the method 300 uses a binary threshold filter, it allows the method 300 to segment the image and some pixels are dropped. For grey scale images, it can generate a plain binary image.

With regard to median filtering, at block 316 during the second process 314, when the method 300 uses a median filter, it allows the method 300 to remove impulsive or salt-pepper noise. It also preserves edges and reduces random noise.

After using one or more filters or software to edit the image, at block 324, the stroke outline system generates a detailed stroke outline image. In this regard, such a detailed stroke outline image includes an image having a stroke outlines generated in accordance with the second process 314. With further reference to FIG. 5, image 516 provides an exemplary detailed stroke outline image generated at block 324. As shown, the detailed stroke outline image 516 has additional details 544, 525, 534 that are missing in the alternative stroke outline image 512 (543, 524, 533), may have incomplete lines 555, or may have additional details 556. The detailed stroke outline image 516 can be used to improve stroke outlines generated by other technologies or methods, or vice versa. In one example, these additional details in the detailed stroke outline image 516 provides suggestions that the user and/or system can consider and/or use to improve their alternative stroke outline images generated from alternative processes. As another example, aspects of an alternative stroke outline image can be used to provide suggestions to improve the detailed stroke outline image 516.

As described, process 310 can be performed, for example, in parallel to process 314. The method 300 at block 328 obtains an alternative stroke outline image. As described, an alternative stroke outline image refers to a stroke outline image that is generated using another process or implementation, for example, different to that employed via process 314 In one example, obtaining an alternative stroke outline image includes generating the alternative stroke outline image using an alternative process 310. The alternative process 310 can be performed in parallel to the second process 314. Any conventional method or any technology can be used as an alternative process. For example, the method 300 can use Adobe® Sumi-Ire®, a technology developed by Adobe® to generate an alternative stroke outline of the captured image. In another example, the method 300 receives the alternative stroke outline image without performing the alternative process.

With further reference to FIG. 5, image 512 illustrates an exemplary alternative stroke outline generated by an alternative process. In one example, the alternative stroke outline may be missing details, may be incomplete, etc. For example, alternative stroke outline image 512, may not have a complete outline of the leash 524 as seen in the original image 504. It also has an incomplete outline of the front-right paw 533 of the dog and also incomplete outline 543 of the right shoulder of the dog. In comparing the image 512 (alternative stroke outline image) with image 516 (detailed stroke outline image), the outline of the leash is visible 525 in the detailed stroke outline image 516 but missing 524 in the alternative stroke outline image 512. The detailed stroke outline image 516 has a more complete outline of the front-right paw 534, and this detail seems to be incomplete 533 in the alternative stroke outline image 512. The detailed stroke outline image shows some outline of the dog's right shoulder 544 which seems to be missing or is incomplete 543 in the alternative stroke outline image 512.

At block 330, the stroke outline system uses the detailed stroke outline image generated at block 324 and/or the alternative stroke outline image to modify or enhance one or the other. For example, in some embodiments, the detailed stroke outline image is used to improve the alternative stroke outline. In other embodiments, the alternative stroke outline is used to improve the detailed stroke outline. In particular, one stroke outline, such as the detailed stroke outline, can be used to provide additional stroke outline details as suggestions to improve the alternative stroke outline image generated at block 328. In one example, the method 300 compares the stroke outlines between the detailed stroke outline image 324 and the alternative stroke outline image 328 and uses the comparison to provide suggestions that can complete incomplete stroke lines in the alternative stroke outline image 328, add additional details to the alternative stroke outline image 328, or remove or modify details in the alternative stroke outline image 328. For example, the detailed stroke outline image 324 is compared with the alternative stroke outline image 328 to determine stroke details present in the detailed stroke outline image 324 and absent in the alternative stroke outline image 328.

In some embodiments, a stroke outline image, such as alternative stroke outline image 328, is modified by adding the additional details (e.g., from the detailed stroke outline image 324) as an additional layer over the stroke outline image (e.g., alternative stroke outline image 328). Such additional layers are provided as suggestions and can be accepted, declined, and/or modified by the user and/or system. In some embodiments, the alternative stroke outline image 328 is modified by adding only a portion of stroke outlines of additional details from the detailed stroke outline image 324. For example, the alternative stroke outline image 328 is modified by including as suggestions at least a portion of stroke details present in the detailed stroke outline image 324 and absent in the alternative stroke outline image 328.

In some embodiments, the method 300 adds the additional stroke outlines seen in the detailed stroke outline image 324 to the alternative stroke outline image 328 and provides those as suggestions to the user and/or system to add, remove, or modify. In some embodiments, the method 300 automatically reviews stroke outlines from the detailed stroke outline image 324 and/or the alternative stroke outline image 328. The method 300 can add some details based on learning experience of history of prior suggestions that were used by the user and/or system, or on predetermined criteria, and/or from analyzing the selected image and/or the stroke outline images 324, 328. The method 300 then determines which details to keep, remove, and/or modify. In some embodiments, the method 300 at block 330 compares the stroke outlines from both the stroke outline images 324, 328 and highlights differences for the user and/or system to review. In some embodiments, the method 300 uses machine learning algorithms to review the decisions made in the past and learns the preferences of the user and/or system and uses that to edit the image.

In some embodiments, the modified alternative stroke outline generated at block 330 is displayed to the end user and/or system so that the user can manually edit the modified alternative stroke outline image generated at block 330. The method 300 can highlight suggestions or guides for the user and/or system to review. For example, the method 300 can place red color boxes around area where it added additional details to the alternative stroke outline image 328 based on the detailed stroke outline image 324. In one example, the user and/or system can make manual edits by removing or modifying the suggestions added to the alterative stroke outline image 328. The user and/or system can edit the drawings by tapping the highlighted areas to add or eliminate details or draw over the highlighted areas to edit the alternative stroke outline image.

With further reference to FIG. 5, image 520 illustrates an exemplary modified alternative stroke outline image. The method 300 added only certain details as suggestions from the detailed stroke outline image 516 to the alternative stroke outline image 512 to create the modified alternative stroke outline image 520. For example, not all the minor details seen in the face of the dog in the detailed stroke outline image 516 were added as suggestions in the modified alternative stroke outline image 520. Image 560 illustrates the same exemplary modified alternative stroke outline image as image 520 but highlights the details 545, 526, 535 that were added to the alternative stroke outline image 512. Certain details, such as an improved outlines of the leash 526 and an improved outline of the front-right paw 535 and the right shoulder 545 of the dog, were added to the alternative stroke outline image 512 from the detailed stroke outline image 516 to create the modified alternative stroke outline image 520.

At block 332, the stroke outline system generates a final stroke outline image. In one embodiment, the method 300 reduces variations or discrepancies that might have been added to the modified alternative stroke outline image generated at block 330. For example, in some embodiments, if the method 300 used an algorithms consisting of different filters to generate the detailed stroke outline image at block 324 and Adobe® Sumi-Ire® was used to generate the alternative stroke outline image at block 328, the stroke outlines generated in the detailed stroke outline image at block 324 may be wider than the stroke outlines generated in the alternative stroke outline image at block 328. It should be understood that other type of variations and discrepancies can be present in the modified alternative stroke outline image 330, and the method 300 at block 332 can attempt to remove those discrepancies at block 332. In some embodiments, the method 300 at block 332 cleans up the modified alternative stroke outline image by removing noise or removing incomplete stroke lines that are by themselves or do not create any image, or by analyzing the original selected image and determining the stroke lines that are incomplete or are not needed. In some embodiments, the method 300 at block 332 can perform a curve fitting process to create salient stroke vectors of a single width or the like.

The vectors allow the strokes that are generated from different technologies to adhere to a single width. For example, a vectorization engine can be used to take a raster image that consists of pixels and converts the image as a vector image. Performing vectorization on the image converts the image from a raster image to an image including vector lines. A vector image does not pixelate to provide edgy outputs when the image is zoomed in and the vector image is scalable to any size. The vector image allows the modified alternative stroke outline image to have a single width regardless of which technology generated the stroke outline. Further, vector images are a universal format and can be used to be convert to any other format.

In some embodiments, the method 300 analyzes the modified alternative stroke outline image, generated at block 330, and allows the stroke outlines in the modified alternative stroke outline image to adhere to a particular format. In some embodiments, the system can edit the stroke outlines to adhere to a single strength or make the stroke outlines snap to straighter lines. In some embodiments, the method 300 can use processes, such as an image trace, to modify the stroke outlines in the modified alternative stroke outline image. It should be understood that any process and any combination of processes can be used to edit the modified alternative stroke outline image at block 332.

With further reference to FIG. 5, image 560 illustrates an exemplary modified alternative stroke outline that the user and/or system can view and further edit. For example, the additional details 545, 535, 526 that were added by the method 300 from the detailed stroke outline image 516 to the alternative stroke outline image 512 can be highlighted for the user and/or system. They can be highlighted by adding boxes 545, 526, and 535 around those suggestions or guides. They can be highlighted by displaying those suggestions or guides in a different color or display those suggestions or guides differently that can be discerned by the user and/or system or the like. The user can use any gesture or movement to edit the suggestions or guides. For example, the user can tap or slide on those boxes 545, 526, 535 to accept the changes and/or use a finger or a pen to draw over the areas 558 in order to complete lines or modify the stroke outline. It should be understood that other methods can be used by the user to modify the modified alternative stroke outline image 560.

In one example, the method 300 adds only certain details as suggestions from the detailed stroke outline image 516 to the alternative stroke outline image 512 to create the modified alternative stroke outline image 520. For example, not all the minor details in the face of the dog or the shoulder area of the dog illustrated in the detailed stroke outline image 516 were added as suggestions in the modified alternative stroke outline image 520. Certain details such as an improved outlines of the leash 526, an improved outline of the front-right paw 535 and the right shoulder 545 of the dog were added to the alternative stroke outline image 512 from the detailed stroke outline image 516 to create the modified alternative stroke outline image 520.

It should be understood that while two parallel processes 310, 314 are illustrated in method 300, method 300 can include one or more parallel processes. For example, method 300 can combine process 306 and 314 into one process and perform the alternative process 310 as a separate process. In some embodiments, the method 300 combines all the processes 306, 314, and 310 into one process or into one or more processes. In another embodiment, the method 300 performs all three processes 306, 310, 314 in parallel. It also be understood that any of these blocks illustrated in method 300 are optional and can be removed or performed in any order.

In one example, the method 300 does not perform the first process 306 and only performs the second process 314 and the alternative process 310 on the input image. For example, the method 300 performs a detailed stroke outline process 314 on the input image to generate a detailed stroke outline image at block 324. In parallel, the method 300 receives an alternative stroke outline image of the input image at block 328. The method 300 generates a modified alternative stroke outline image at block 330 and then generates a final stroke outline image at block 332 as further described above. It should be understood that any combination of processes 306, 314, 310 can be performed.

Figure 4:
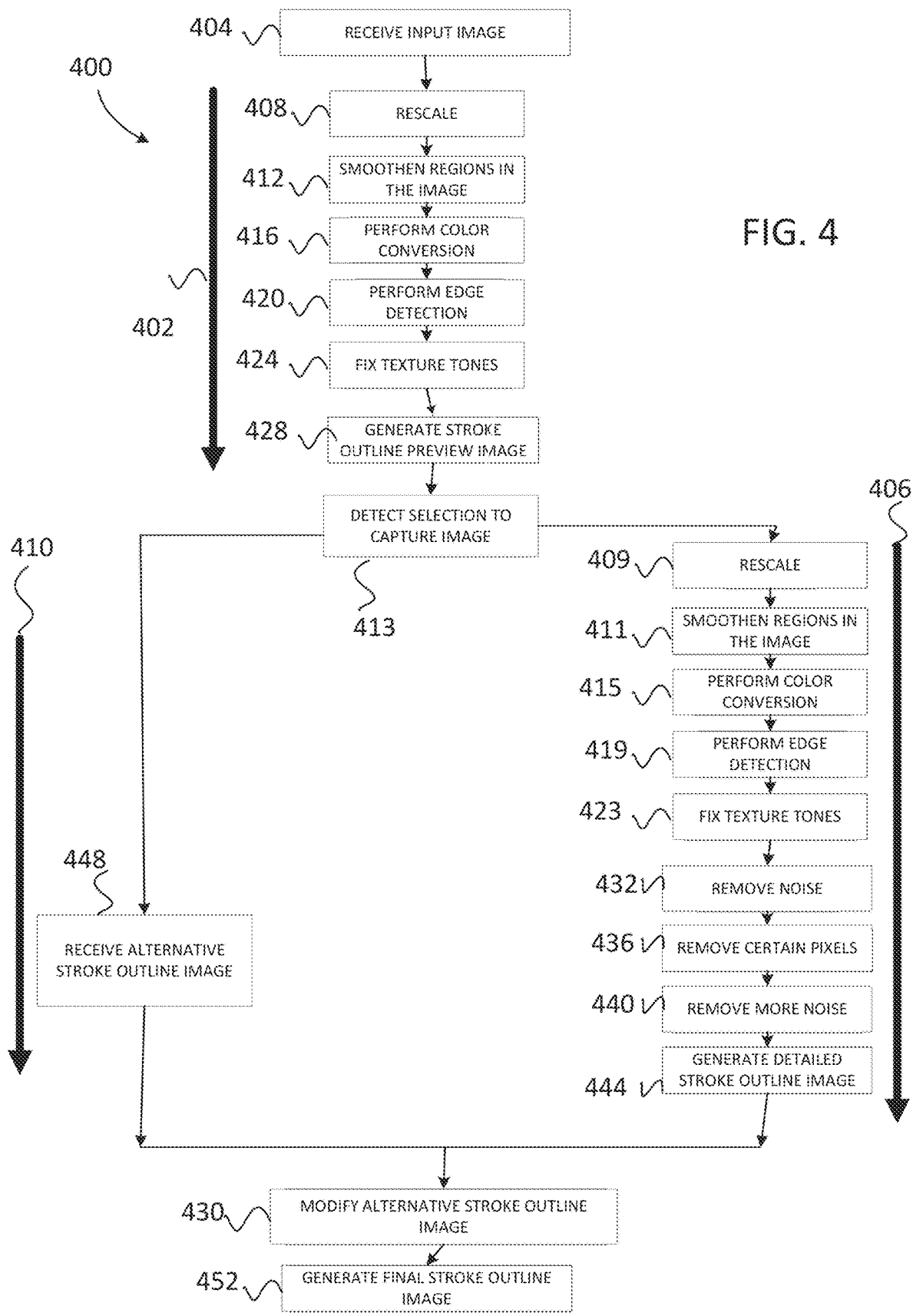
FIG. 4 is a flow diagram illustrating another exemplary method for implementing preview and capture of stroke outlines in accordance with one embodiment of the present disclosure.

With reference to FIG. 4 and FIG. 5, FIG. 4 is a flow diagram illustrating another exemplary method 400 for implementing preview and capture of stroke outlines in accordance with one embodiment of the present disclosure. FIG. 5 are images illustrating one embodiment preview and capture of stroke outline method in accordance to one embodiment of the present disclosure. A processing device such as a user device, an image capturing device, a server, a cloud computing service or the like implements the exemplary method 400. The stroke outline system can initiate the preview and capture of stroke outline method 400 as described herein.

As shown in FIG. 4, in one embodiment at block 404, a stroke outline system receives an input image (e.g. a static image from a database, images from a live video feed, or images from a non-live video feed from a database etc.). In some embodiments, the received image is images from a live video camera feed generated by a user device, such as a user device 206 of FIG. 2. In some embodiments, the received images are images from a non-live video. The non-live video feed can be a video that was previously recorded and/or created. The non-live video feed can be stored in a database and/or server. In some embodiments, the received image can be a static image from a database and/or server.

In accordance with obtaining an input image, the stroke outline system performs a first process 402. The first process 402 can be a real-time preview GPU pipeline that generates a stroke outline preview from the input image. Generally, the method 400 during the first process 402 quickly generates preview of a stroke outline image. The stroke outline preview image is generated to provide a user with quick feedback of a sample or potential stroke outline image that may be captured. This can be useful as a user and/or system is trying to capture a scene or trying to decide which image to capture from a live-feed seen from a camera, or the like. It can also be useful when a user is trying to decide which image from a previously recorded video (non-live video) to use for generating a final stroke outline image. It can also be useful when a user is trying to decide which static image from a database of images to use for generating a final stroke outline image. Further, generating and providing such a preview allows the user and/or system to perform more experimentation while trying to capture or select the image to perform the preview and capture stroke outlines method on. As the stroke outline preview image is generated in an expedient manner (such that it can be presented in real time and as the user moves the image capturing components), in some cases, the stroke outline preview image is not of a highest quality and, as such, can have noise, minor unwanted details, incomplete lines, or the like.

As part of the first process 402, the stroke outline system, at block 408 rescales the image. This can be done using a bilinear scaling filter or any other process to perform similar processing on the image. During the first process 402 at block 408, when the stroke outline system uses a bilinear scaling filter, it allows the stroke outline system to make the texture size of the image smaller, thereby improving the response time of the parallel processes 402 (and process 406). In one example, a scaling value of ½ can be used which may help in reducing hardware noises such as unwanted random variations of brightness and/or color. These hardware noises can be introduced when working with a live camera feed due to sensors and/or electric circuits in the system and/or camera.

As part of the first process, the stroke outline system, at block 412 smoothens regions in the image. This can be performed using bilateral filter to smoothen one or more regions in the image or any other process to perform similar processing on the image. In one embodiment, the stroke outline system can use machine language or other algorithms to determine which regions to smoothen.

During the first process 402 at block 412, when the stroke outline system uses bilateral filter, it allows the stroke outline system to smoothen the image. It should be understood that any other filter or software can be used to smoothen the image. Bilateral filter is a non-linear, edge preserving and noise reducing smoothening filter for the images. Performing bilateral filtering can be slow, however scaling the image before performing bilateral filter can allow the stroke outline system to speed up the process during bilateral filtering. During the bilateral filtering process, the color of each pixel is replaced with a weighted average of colors from nearby pixels. The weight assigned to a neighboring pixel is proportional to its spatial and color closeness with the pixel in consideration. For every pixel p, the weights for all the neighboring pixels in a 5-pixel radius is calculated. For a neighboring pixel pij, the weight wij is defined as:

$$w_{ij} = e^{\left(\frac{-distSq(p,pij)}{2\sigma_1^2}\right)} * e^{\left(-0.2 * \frac{colorDistance(p,pij)}{2\sigma_2^2}\right)} \quad \text{Equation (1)}$$

The new color values $p_{new}$ for pixel p is defined as:

$$p_{new} = \frac{\sum_{i=-5, j=-5}^{i=5, j=5}(p_{ij} * w_{ij})}{\sum_{i=-5, j=-5}^{i=5, j=5} w_{ij}} \quad \text{Equation (2)}$$

During the first process 402 at block 416, the stroke outline system performs color conversion. This can be performed using RGB to luminance conversion filter to convert colors or any other process to perform similar processing on the image. At block 416, when the stroke outline system performs color conversion by using a RGB to luminance filter, it allows the stroke outline system to convert the RGB channel of each pixel to a single luminance value. Since the final stroke outline image displays black outlines, converting the RGB channel of each pixel to single luminance value allows the method to reduce computation need. For example, if the pixels still carry a color value after the bilateral filtering or bilinear scaling filtering, it can increase the computational need. By converting the color channels of each pixel to a single luminance value assists in improving the speed of the processes 402, 406 and also reducing complexity.

During the first process 402 at block 420, the stroke outline system performs edge detection. This can be performed using a Sobel edge detection filter or any other process to perform similar processing on the image. At block 420, when the stroke outline system performs edge detection filtering using a Sobel filter, it can detect edges. For example, a Sobel-Feldman operator can be used for each of the pixel.

During the first process 402 at block 424, the stroke outline system fixes texture tones. This can be performed using a levels adjustment filter or any other process to perform similar processing on the image. The levels adjustment filter can use a lower threshold. At block 424, when the stroke outline system fixes texture tones using a levels adjustment filter, it can allow the stroke outline system to correct the tonal range and color imbalance of the image by adjusting the intensity levels of the image shadows, midtones, highlights, or the like. The levels adjustment filter can be used to adjust the grey scale content in the processed frame. In one example, the output levels can be kept fixed at 0 (indicating pure black color) and 255 (indicating pure white color). The mid tones can be fixed at 0.4, with low and high end tones evenly spaced with difference of 0.15 value if a normalized scale of 0-1 is considered.

In continuation of the first process 402, the stroke outline system at block 428 generates a stroke outline preview image. In one example, the blocks are performed in the following order to generate a stroke outline preview image: block 408 then block 412, then block 416, then block 420, then block 424. It should be understood that any combination of the blocks 408, 412, 416, 420, 424 in the first process 402 can be performed in any order and any combination of the blocks 408, 412, 416, 420, 424 can be used or removed from the first process 402. The stroke outline preview image allows the user and/or system to change the angle of the camera during the live video feed to capture a more desirable shot or the like. With further reference to FIG. 5, the stroke outline system generates and provides a preview as illustrated in image 508. Using any combination of filters or software in blocks 408, 412, 416, 420, 424 allows the stroke outline system to generate a preview 508 at block 428 of an input image 504 (e.g. a static image from a database, images from a live video feed, or images from a non-live video feed from a database etc.). The stroke outline preview image 508 is not complete, but provides a quick feedback of the stroke outline that can be expected from performance of the stroke outline system.

Advantageously, the stroke outline preview image allows the user and/or system to change the angle of the camera, change settings in the camera, change the objects in the shot, change the lighting from the camera, and/or select another image from memory, among other things, in order to capture a more desirable stroke outline image, video feed When the user is satisfied with the details provided in the stroke outline preview image, the user may select to capture the image for subsequent use in generating stroke outline image. As such, as shown at block 413, the stroke outline system can detect a selection to capture the image, or other indicator that a particular image should be used to generate a stroke outline image. In another embodiment, the stroke outline system automatically captures or selects a selected image based on reviewing the stroke outline preview image generated at block 428. In some embodiments, the stroke outline system uses machine learning or any other algorithm to determine the selected image from a live video feed or images based on, among other things, user and/or system's previous preferences or predetermined constrains or the like.

In accordance with detecting a selection to capture an image, process 406 and/or process 410 can be initiated. Any of processes 402, 406, 410 can be performed in parallel. As one example, processes 406 and 410 are initiated upon detection of a captured image. In other cases, processes 402 is performed in parallel with process 406 and/or 410.

Turning to the second process 406, process 406 may be referred to as a detailed stroke outline GPU pipeline. In some embodiments, the process 406 can be performed in parallel to alternative process 410. Generally, the process 406 performs a detailed stroke outline process on the selected image. In one example, the process 406 generates a detailed stroke outline image by performing more image processing on the selected image than the first process 406 does on the input image. In this regard, in some implementations, the process 406 can be thought of as part of the data processing pipeline that continues with regard to process 402.

During the process 406 at block 413, the stroke outline system receives the selected image and performs the rest of the processes at blocks 409, 411, 415, 419, 423, 432, 436, 440, 444 on the selected image. In one embodiment, the stroke outline system, during process 406, processes the blocks in the following order, first block 409, then block 411, then block 415, then block 419, then block 423, then block 436, then block 440, then block 444. In one embodiment, the stroke outline system, during process 406, performs any combination of the blocks 408, 412, 416, 420, 424, 432, 436, 440, 444 in any order.

During the second process 406 at block 409, the stroke outline system smoothens regions in the image. This can be done using a bilinear scaling filter or any other process to perform similar processing on the image. During the second process 406 at block 409, when the stroke outline system uses a bilinear scaling filter, it allows the stroke outline system to make the texture size of the selected image smaller, thereby improving the response time of the parallel processes 402, 406. In one example, a scaling value of ½ can be used which may help in reducing hardware noises.

As part of process 406 at block 411, the stroke outline system smoothens regions in the image. This can be performed using bilateral filter to smoothen one or more regions in the image or any other process to perform similar processing on the image. In one embodiment, the stroke outline system can use machine language or other algorithms to determine which regions to smoothen.

The stroke outline system uses a bilateral filter. The bilateral filter can be used to smoothen the image. It should be understood that any other filter or software can be used to smoothen the image. A bilateral filter is a non-linear, edge preserving and noise reducing smoothening filter for the images. Performing bilateral filtering can be slow, therefore scaling the image before performing bilateral filtering allows the process 406 to speed up.

During the process 406 at block 415, the stroke outline system performs color conversion. This can be performed using a RGB to luminance conversion filter to convert colors or any other process to perform similar processing on the image. At block 415, when the stroke outline system performs color conversion by using a RGB to luminance filter, it allows the stroke outline system to convert the RGB channel of each pixel to a single luminance value. Since the final stroke outline image displays black outlines, converting the RGB channel of each pixel to single luminance value allows the method to reduce computation need. For example, if the pixels still carry a color value after the bilateral filtering or bilinear scaling filtering, it can increase the computational need. By converting the color channels of each pixel to a single luminance value assists in improving the speed of the processes 402, 406 and also reduces complexity.

During the process 406 at block 419, the stroke outline system performs edge detection. This can be performed using Sobel edge detection filter or any other process to perform similar processing on the image. At block 419, when the stroke outline system performs edge detection filtering using a Sobel filter, it can detect edges. For example, a Sobel-Feldman operator can be used for each of the pixel.

During the process 406 at block 423, the stroke outline system fixes texture tones. This can be performed using a levels adjustment filter or any other process to perform similar processing on the image. The levels adjustment filter can use a higher threshold. In one example, the stroke outline system uses a levels adjustment filter where the output levels are kept fixed at 0 (indicating pure black color) and 255 (indicating pure white color). The mid tones can be fixed at 0.7 with low and high end tones evenly spaced with difference of 0.15 value (if considering a normalized scale value from 0-1).

During the process 406 at block 432, the stroke outline system removes noise artifacts=. This can be performed using a Gaussian blur filter or any other process. At block 432, when the stroke outline system uses a Gaussian blur filter, it can remove noise artifacts. The Gaussian blur filter can also reduce the image quality at a few areas in the image, but using the Gaussian blur filter in conjunction with a threshold filter can provide sharp outlines that can be used for the detailed stroke outline image.

During the process 406 at block 436, the stroke outline system reviews the image and removes certain pixels. For example, the stroke outline system at block 436 segments the image and removed pixels that are not needed. It can use a binary threshold filter or any other software to perform this process. For grey scale images, this process can generate a plain binary image.

During the process 406 at block 440, the stroke outline system removes impulsive or salt-pepper noise. In one example, the stroke outline method can use a median filter or another software to perform this process. This can also preserve edges and reduce random noise.

In continuation of the first process 402, the stroke outline system at block 444 generates a detailed stroke outline image. With further reference to FIG. 5, image 516 is an exemplary detailed stroke outline image generated at block 444. With further reference to FIG. 5, image 516 provides an exemplary detailed stroke outline image generated at block 324. As shown, the detailed stroke outline image 516 has additional details 544, 525, 534 that are missing in the alternative stroke outline image 512 (543, 524, 533), may have incomplete lines 555, or may have additional details 556. The detailed stroke outline image 516 can be used to improve stroke outlines generated by other technologies or methods, or vice versa. In one example, these additional details in the detailed stroke outline image 516 provides suggestions that the user and/or system can consider and/or use to improve their alternative stroke outline images generated from alternative processes. As another example, aspects of an alternative stroke outline image can be used to provide suggestions to improve the detailed stroke outline image 516.

As described, process 410 can be performed, for example, in parallel to process 406. The stroke outline image at block 448 obtains an alternative stroke outline image. As described, an alternative stroke outline image refers to a stroke outline image that is generated using another process or implementation, for example, different to that employed via process 406. In one example, obtaining an alternative stroke outline image includes generating the alternative stroke outline image using an alternative process 448. The alternative process 410 can be performed in parallel to the second process 406. Any conventional method or any technology can be used as an alternative process. For example, the stroke outline system can use Adobe® Sumi-Ire®, a technology developed by Adobe® to generate an alternative stroke outline of the captured image during process 410. In another example, the stroke outline system receives the alternative stroke outline image 448 without performing an alternative process.

With further reference to FIG. 5, image 512 illustrates an exemplary alternative stroke outline generated by an alternative process. In one example, the alternative stroke outline may be missing details, may be incomplete, etc. For example, alternative stroke outline image 512, may not have a complete outline of the leash 524 as seen in the original image 504. It also has an incomplete outline of the front-right paw 533 of the dog and also incomplete outline 543 of the right shoulder of the dog. In comparing the image 512 (alternative stroke outline image) with image 516 (detailed stroke outline image), the outline of the leash is visible 525 in the detailed stroke outline image 516 but missing 524 in the alternative stroke outline image 512. The detailed stroke outline image 516 has a more complete outline of the front-right paw 534, and this detail seems to be incomplete 533 in the alternative stroke outline image 512. The detailed stroke outline image shows some outline of the dog's right shoulder 544 which seems to be missing or is incomplete 543 in the alternative stroke outline image 512.

At block 430, the stroke outline system uses the detailed stroke outline image generated at block 444 and/or the alternative stroke outline image to modify or enhance one or the other. For example, in some embodiments, the detailed stroke outline image is used to improve the alternative stroke outline. In other embodiments, the alternative stroke outline is used to improve the detailed stroke outline. In particular, one stroke outline, such as the detailed stroke outline, can be used to provide additional stroke outline details as suggestions to improve the alternative stroke outline image generated at block 448. In one example, the stroke outline system compares the stroke outlines between the detailed stroke outline image 444 and the alternative stroke outline image 448 and uses the comparison to provide suggestions that can complete incomplete stroke lines in the alternative stroke outline image 448, add additional details to the alternative stroke outline image 448, or remove or modify details in the alternative stroke outline image 448.

In some embodiments, a stroke outline image, such as alternative stroke outline image 448, is modified by adding the additional details (e.g., from the detailed stroke outline image 444) as an additional layer over the stroke outline image (e.g., alternative stroke outline image 448). Such additional layers are provided as suggestions and can be accepted, declined, and/or modified by the user and/or system. In some embodiments, the alternative stroke outline image 448 is modified by adding only a portion of stroke outlines of additional details from the detailed stroke outline image 444.

In some embodiments, the stroke outline system adds the additional stroke outlines seen in the detailed stroke outline image 444 to the alternative stroke outline image 448 and provides those as suggestions to the user and/or system to add, remove, or modify. In some embodiments, the stroke outline system automatically reviews stroke outlines from the detailed stroke outline image 444 and/or the alternative stroke outline image 448. The stroke outline system can add some details based on learning experience of history of prior suggestions that were used by the user and/or system, or on predetermined criteria, and/or from analyzing the selected image and/or the stroke outline images 444, 448. The stroke outline system then determines which details to keep, remove, and/or modify. In some embodiments, the stroke outline system at block 430 compares the stroke outlines from both the stroke outline images 444, 448 and highlights differences for the user and/or system to review. In some embodiments, the stroke outline system uses machine learning algorithms to review the decisions made in the past and learns the preferences of the user and/or system and uses that to edit the image.

In some embodiments, the modified alternative stroke outline generated at block 430 is displayed to the end user and/or system so that the user can manually edit the modified alternative stroke outline image generated at block 430. The stroke outline system can highlight suggestions or guides for the user and/or system to review. For example, the stroke outline system can place red color boxes around area where it added additional details to the alternative stroke outline image 448 based on the detailed stroke outline image 444. In one example, the user and/or system can make manual edits by removing or modifying the suggestions added to the alterative stroke outline image 448. The user and/or system can edit the drawings by tapping the highlighted areas to add or eliminate details or draw over the highlighted areas to edit the alternative stroke outline image.

With further reference to FIG. 5, image 520 illustrates an exemplary modified alternative stroke outline image. The stroke outline system added only certain details as suggestions from the detailed stroke outline image 516 to the alternative stroke outline image 512 to create the modified alternative stroke outline image 520. For example, not all the minor details seen in the face of the dog in the detailed stroke outline image 516 were added as suggestions in the modified alternative stroke outline image 520. Certain details, such as an improved outlines of the leash 526 and an improved outline of the front-right paw 535 and the right shoulder 545 of the dog, were added to the alternative stroke outline image 512 from the detailed stroke outline image 516 to create the modified alternative stroke outline image 520.

At block 452, the stroke outline system generates a final stroke outline image. In one embodiment, the stroke outline system reduces variations or discrepancies that might have been added to the modified alternative stroke outline image generated at block 430. For example, in some embodiments, if the stroke outline system used an algorithms consisting of different filters to generate the detailed stroke outline image at block 444 and Adobe® Sumi-Ire® was used to generate the alternative stroke outline image at block 448, the stroke outlines generated in the detailed stroke outline image at block 444 may be wider than the stroke outlines generated in the alternative stroke outline image at block 448. It should be understood that other type of variations and discrepancies can be present in the modified alternative stroke outline image 430, and the stroke outline system at block 452 can attempt to remove those discrepancies at block 452. In some embodiments, the stroke outline system at block 452 cleans up the modified alternative stroke outline image by removing noise or removing incomplete stroke lines that are by themselves or do not create any image, or by analyzing the original selected image and determining the stroke lines that are incomplete or are not needed.

In some embodiments, the stroke outline system at block 452 can perform a curve fitting process to create salient stroke outlines of a single width or the like. For example, a vectorization engine can be used to take a raster image that consists of pixels and converts the image as a vector image. Performing vectorization on the image converts the image from a raster image to an image including vector lines. A vector image does not pixelate to provide edgy outputs when the image is zoomed in and the vector image is scalable to any size. The vector image allows the modified alternative stroke outline image to have a single width regardless of which technology generated the stroke outline. Further, vector images are a universal format and can be used to be convert to any other format.

In some embodiments, the stroke outline system analyzes the modified alternative stroke outline image, generated at block 430, and allows the stroke outlines in the modified alternative stroke outline image to adhere to a particular format. In some embodiments, the system can edit the stroke outlines to adhere to a single strength or make the stroke outlines snap to straighter lines. In some embodiments, the stroke outline system can use processes, such as an image trace, to modify the stroke outlines in the modified alternative stroke outline image. It should be understood that any process and any combination of processes can be used to edit the modified alternative stroke outline image at block 452.

With further reference to FIG. 5, image 560 illustrates an exemplary modified alternative stroke outline that the user and/or system can view and further edit. For example, the additional details 545, 535, 526 that were added by the stroke outline system from the detailed stroke outline image 516 to the alternative stroke outline image 512 can be highlighted for the user and/or system. They can be highlighted by adding boxes 545, 526, and 535 around those suggestions or guides. They can be highlighted by displaying those suggestions or guides in a different color or display those suggestions or guides differently that can be discerned by the user and/or system or the like. The user can use any gesture or movement to edit the suggestions or guides. For example, the user can tap or slide on those boxes 545, 526, 535 to accept the changes, and/or use a finger or a pen to draw over the areas 558 in order to complete lines or modify the stroke outline. It should be understood that other methods can be used by the user to modify the modified alternative stroke outline image 560.

In one example, the stroke outline system adds only certain details as suggestions from the detailed stroke outline image 516 to the alternative stroke outline image 512 to create the modified alternative stroke outline image 520. For example, not all the minor details in the face of the dog or the shoulder area of the dog illustrated in the detailed stroke outline image 516 were added as suggestions in the modified alternative stroke outline image 520. Certain details such as an improved outlines of the leash 526, an improved outline of the front-right paw 535 and the right shoulder 545 of the dog were added to the alternative stroke outline image 512 from the detailed stroke outline image 516 to create the modified alternative stroke outline image 520.

It should be understood that while two parallel processes 410, 406 are illustrated in stroke outline system, stroke outline system can include one or more parallel processes. For example, stroke outline system can combine process 402 and 406 into one process and perform the alternative process 410 as a separate process. In some embodiments, the stroke outline system combines all the processes 402, 406, and 410 into one process or into one or more processes. In another embodiment, the stroke outline system performs all three processes 402, 410, 406 in parallel. It also be understood that any of these blocks illustrated in stroke outline system are optional and can be removed or performed in any order.

In one example, the stroke outline system does not perform the first process 402 and only performs the second process 406 and the alternative process 410 on the input image. For example, the stroke outline system performs a detailed stroke outline process 406 on the input image to generate a detailed stroke outline image at block 444. In parallel, the stroke outline system receives an alternative stroke outline image of the input image at block 448. The stroke outline system generates a modified alternative stroke outline image at block 430 and then generates a final stroke outline image at block 452 as further described above. It should be understood that any combination of processes 402, 406, 410 can be performed.

Figure 6:
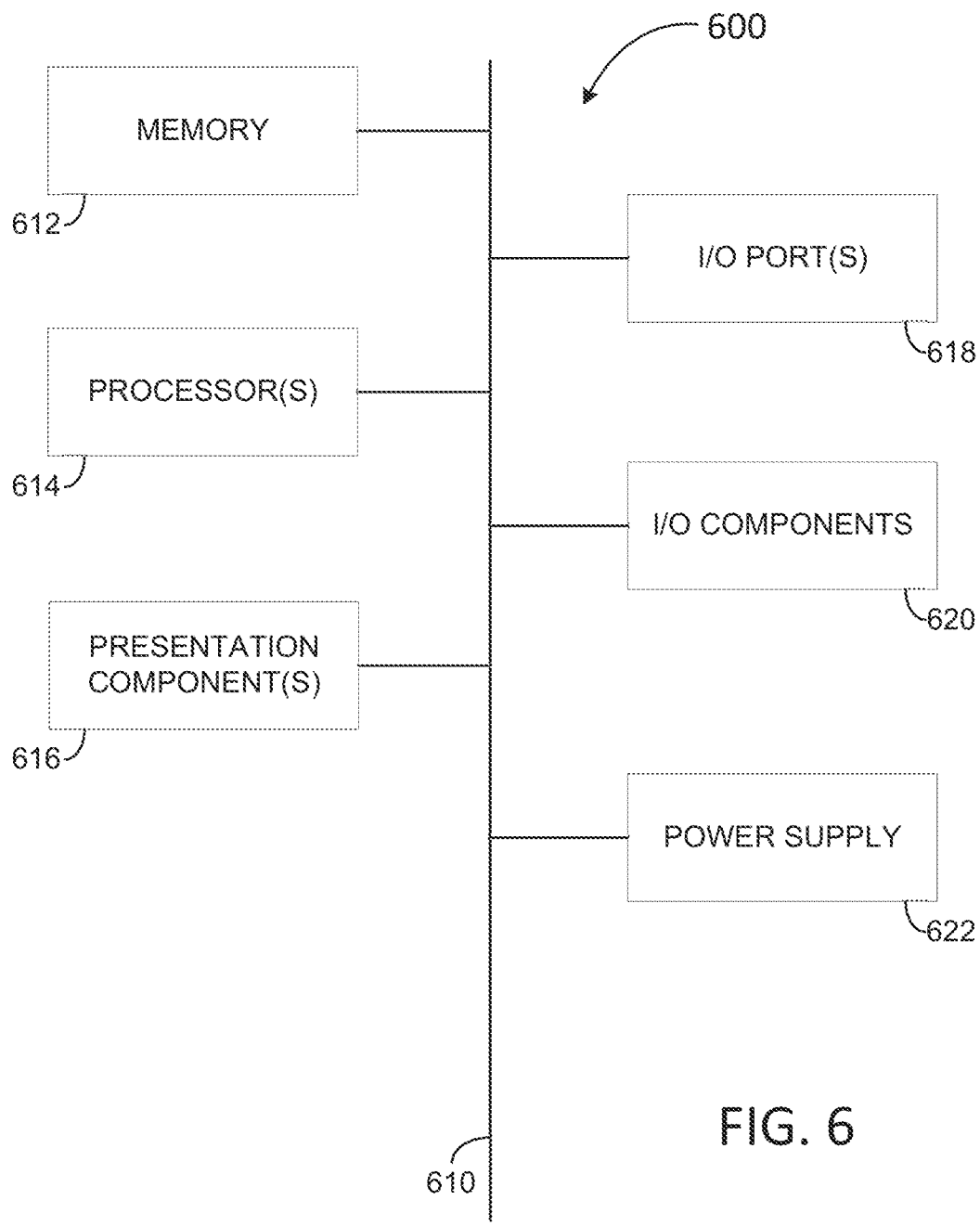
FIG. 6 is an exemplary operating environment for implementing embodiments of the present technology.

Having described implementations of the present disclosure, an exemplary operating environment in which embodiments of the present technology may be implemented is described below in order to provide a general context for various aspects of the present disclosure. Referring to FIG. 6, an exemplary operating environment for implementing embodiments of the present technology is shown and designated generally as computing device 600. Computing device 600 is but one example of a suitable computing environment and is not intended to suggest any limitation as to the scope of use or functionality of the technology described herein. Neither should the computing device 600 be interpreted as having any dependency or requirement relating to any one or combination of components illustrated.

The technology may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The technology described herein may be practiced in a variety of system configurations, including hand-held devices, consumer electronics, general-purpose computers, more specialty computing devices, etc. The technology described herein may also be practiced in distributed computing environments where tasks are performed by remote-processing devices that are linked through a communications network.

With reference to FIG. 6, computing device 600 includes bus 610 that directly or indirectly couples the following devices: memory 612, one or more processors 614, one or more presentation components 616, input/output (I/O) ports 618, input/output components 620, and illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 6 is merely illustrative of an exemplary computing device that can be used in connection with one or more embodiments of the present disclosure. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user and/or system or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc. The I/O components 620 may provide a natural user and/or system interface (NUI) that processes air gestures, voice, or other physiological inputs generated by a user and/or system. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 600. The computing device 600 may be equipped with depth cameras, such as, stereoscopic camera systems, infrared camera systems, RGB camera systems, and combinations of these for gesture detection and recognition. Additionally, the computing device 600 may be equipped with accelerometers or gyroscopes that enable detection of motion.

Aspects of the present technology have been described in relation to particular embodiments, which are intended in all respects to be illustrative rather than restrictive. Alternative embodiments will become apparent to those of ordinary skill in the art to which the present technology pertains without departing from its scope.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described herein may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present disclosure are described with reference to a distributed computing environment; however, the distributed computing environment depicted herein is merely exemplary. Components can be configured for performing certain embodiments, where the term "configured for" can refer to "programmed to" perform particular tasks or implement particular abstract data types using code. Further, while embodiments of the present disclosure may generally refer to the technical solution environment and the schematics described herein, it is understood that the techniques described may be extended to other implementation contexts.

From the foregoing, it will be seen that this technology is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computer-implemented method for generating an improved stroke outline, the method comprising:
    generating a stroke outline preview image by performing an edge detection process on an input image, the stroke outline preview image providing a preview indicating an example of a stroke outline image to be provided for the input image;
    based on a selection of the input image in accordance with presenting the stroke outline preview image, generating a detailed stroke outline image for the input image using a detailed stroke outline process;
    obtaining an alternative stroke outline image for the input image using an alternative outline process; and
    modifying the alternative stroke outline image by including in the alternative stroke outline image a portion of stroke outlines from the detailed stroke outline image.

2. The method of claim 1, wherein the input image is selected from a video feed.

3. The method of claim 1, wherein the detailed stroke outline process is performed in parallel to the alternative outline process.

4. The method of claim 1, wherein the edge detection process uses a bilateral filter, a Sobel filter, and a levels adjustment filter with a low threshold to generate the stroke outline preview image.

5. The method of claim 1, wherein the edge detection process uses a bilinear scaling filter, a bilateral filter, a Red, Green, and Blue (RGB) to luminance conversion filter, a Sobel edge detection filter, and a levels adjustments filter with a low threshold to generate the stroke outline preview image.

6. The method of claim 1, wherein the detailed stroke outline process uses a bilateral filter, a Sobel filter, a binary threshold filter, and a Median Filter to generate a detailed stroke outline preview image.

7. The method of claim 1, wherein the detailed stroke outline process uses a bilinear scaling filter, a bilateral filter, a Red, Green, and Blue (RGB) to luminance conversion filter, a Sobel edge detection filter, a levels adjustments filter with a high threshold value, a Gaussian blur filter, a binary threshold filter, and a median filter to generate the detailed stroke outline preview image.

8. The method of claim 1, wherein the detailed stroke outline image is generated upon a user selection of the input image.

9. The method of claim 1, wherein the detailed stroke outline image and the alternative stroke outline image are generated upon a user selection of the input image in accordance with presenting the stroke outline preview image.

10. The method of claim 1, wherein the portion of stroke outlines from the detailed stroke outline image are included in the alternative stroke outline image as suggestions.

11. The method of claim 10, wherein machine learning is used to accept or decline the suggestions based on user's history.

12. The method of claim 1, further comprising:
generating the stroke outline image to be presented to a user based on the modified alternative stroke outline image, wherein generating the stroke outline image includes performing vectorization on the modified alternative stroke image to convert the modified alternative stroke image from a raster image to an image including vector lines.

13. The method of claim 1, further comprising:
generating the stroke outline image to be presented to a user based on the modified alternative stroke outline image, wherein generating the stroke outline image includes performing curve fitting process to smoothen stroke outlines of the modified alternative stroke outline image.

14. A computer-implemented method for generating an improved stroke outline, the method comprising:
generating a detailed stroke outline image for an input image using a detailed stroke outline process, the detailed stroke outline image including stroke outlines for objects in the input image;
obtaining an alternative stroke outline image generated using an alternative outline process, the alternative outline process performed in parallel to the detailed stroke outline process;
comparing the detailed stroke outline image with the alternative stroke outline image to determine stroke details present in the detailed stroke outline image and absent in the alternative stroke outline image;
modifying the alternative stroke outline image by including as suggestions at least a portion of stroke details present in the detailed stroke outline image and absent in the alternative stroke outline image; and
generating a stroke outline image by including, removing, or modifying each suggestion in the modified alternative stroke outline image.

15. The method of claim 14, wherein each suggestion is included, removed, or modified to generate the stroke outline image based on user selections via a display screen.

16. The method of claim 14, further comprising causing display of the modified alternative stroke outline image with the suggestions visually emphasized in the modified alternative stroke outline.

17. The method of claim 14, wherein the alternative outline process uses a machine learning algorithm to generate the alternative stroke outline image.

18. The method of claim 14, further comprising causing display of the generated stroke outline image.

19. The method of claim 14, further comprising:
generating a stroke outline preview image by performing an edge detection process on the input image, the stroke outline preview image providing a preview of an example version of the stroke outline image to be provided for the input image;
receiving an input image selection based on user's observation of the preview image; and
initiating the detailed stroke outline process and the alternative outline process based on the input image selection.

20. A system comprising:
a memory device; and
a processing device, operatively coupled to the memory device, to perform operations comprising:
generating a stroke outline preview image by performing an edge detection process on an input image, the stroke outline preview image providing a preview indicating an example of a stroke outline image to be generated for the input image;
based on a selection of the input image in accordance with presenting the stroke outline preview image, generating a detailed stroke outline image for the input image using a detailed stroke outline process;
generating an alternative stroke outline image for the input image using an alternative outline process;
modifying the alternative stroke outline image by including, as suggestions, in the alternative stroke outline image a portion of stroke outlines from the detailed stroke outline image;
for each suggestion, identifying whether to include the suggestion, remove the suggestion, or modify the suggestion; and
based on the identifications of whether to include, remove, or modify each suggestion, generating an improved stroke outline for providing for subsequent use.

* * * * *